United States Patent [19]

Takemoto et al.

[11] Patent Number: 5,407,050
[45] Date of Patent: Apr. 18, 1995

[54] ARTICLE CONTROL SYSTEM

[75] Inventors: Takatoshi Takemoto; Kazunari Kawashima; Shigeru Handa, all of Tokyo, Japan

[73] Assignee: Kabushiki Kaisha Ace Denken, Tokyo, Japan

[21] Appl. No.: 108,708

[22] PCT Filed: Mar. 16, 1992

[86] PCT No.: PCT/JP92/00313
§ 371 Date: Sep. 13, 1993
§ 102(e) Date: Sep. 13, 1993

[87] PCT Pub. No.: WO92/16270
PCT Pub. Date: Oct. 1, 1992

[30] Foreign Application Priority Data

Mar. 14, 1991 [JP] Japan .................................. 3-049291

[51] Int. Cl.⁶ .......................... G07F 7/08; G06F 7/04
[52] U.S. Cl. .................................... 194/205; 186/61; 414/273; 340/825.35
[58] Field of Search ..................... 186/52, 55, 56, 59, 186/61; 414/273; 340/825.35, 825.79; 194/205, 206, 207, 210

[56] References Cited

U.S. PATENT DOCUMENTS

| 3,522,664 | 8/1970 | Lambright et al. ........ 340/825.79 X |
| 3,716,697 | 2/1973 | Weir ................................. 186/56 X |
| 3,971,013 | 7/1976 | Challoner et al. ......... 340/825.79 X |
| 4,020,325 | 4/1977 | Pfost et al. ....................... 194/210 X |
| 4,419,734 | 12/1983 | Wolfson et al. ........... 340/825.35 X |
| 4,645,036 | 2/1987 | Nestler ................................. 186/55 |
| 4,673,932 | 6/1987 | Ekchian et al. ........... 340/825.35 X |
| 4,853,695 | 8/1989 | Ueno et al. ................. 340/825.79 X |
| 5,020,958 | 6/1991 | Tuttobene ........................ 414/273 X |
| 5,252,814 | 10/1993 | Tooley ............................... 186/61 X |

FOREIGN PATENT DOCUMENTS

| 50-60345 | 5/1975 | Japan . |
| 52-15354 | 2/1977 | Japan . |
| 52-32398 | 3/1977 | Japan . |
| 56-3025 | 1/1981 | Japan . |
| 60-114283 | 6/1985 | Japan . |
| 60-179181 | 8/1986 | Japan . |
| 60-181480 | 8/1986 | Japan . |

*Primary Examiner*—David A. Bucci
*Assistant Examiner*—Scott L. Lowe
*Attorney, Agent, or Firm*—Lowe, Price, LeBlanc & Becker

[57] ABSTRACT

An article control system has an article stand on which articles on which articles are placed. An article monitor apparatus monitors the entry and exit of articles to and from the article stand. The monitor apparatus includes a planar matrix sensor for detecting the article and a signal processing system for both driving the matrix sensor and detecting the articles placed on the matrix sensor. The matrix sensor is disposed on the upper surface of the article stand. The article stand preferably includes an article placing stand on which the articles are placed and an article confirmation stand on which articles taken from the article placing stand are temporarily placed for confirmation.

13 Claims, 16 Drawing Sheets

ARTICLE CONTROL SYSTEM

FIELD OF THE INVENTION

The present invention relates to an article control system for controlling articles such as prizes, which is installed in a prize exchange place for exchanging game media acquired from playing a game for prizes and the like. The invention particularly relates to an article control system including an article control stand on which articles such as prizes are placed, article labels which are affixed to the articles such as prizes and a computer for control of the articles.

BACKGROUND OF THE INVENTION

In game parlors, game media such as medals, chips, metal balls, etc., which are gained by playing a game may be exchanged for prizes. In such a case, the prizes which are proportional to the quantity of the gained media can be chosen by a player.

To this end, the player throws the gained game media into a game media counter and the count is recorded on a receipt. If the count recording receipt is handed to a clerk in a prize exchange place, the clerk will ask the player which of the prizes he or she desires. The player looks at the prizes arranged on prize shelves and tells the clerk the desired prizes within the number recorded on the receipt.

The clerk then selects the names of the prizes by operating a keyboard of a computer and inputs the quantity through a numerical key-pad.

The computer subtracts the number of game media which is equivalent to the quantity of desired articles from the number of game media recorded on the receipt and notifies the clerk when the equivalent number of game media reaches the number of the game media recorded on the receipt.

The clerk puts the prizes, the number of which is within the number of game media recorded on the receipt into a bag and hands the bag to the player.

In such a manner, exchange of the gained game media for the prizes is conducted.

The kinds and quantity of the prizes placed upon the prize shelves are controlled by the clerk looking after them.

However, in the above mentioned prior art, it is necessary to select the name of the prizes which a player desires by operating specific keys among a number of keys. Experience and skill is needed to quickly select the names of prizes by key operation. If the quantity of the prizes is large, an extended period of time and labor is required for even a skilled person. Mistyping often occurs and services to players deteriorates and correct prize control can not made.

It is necessary to constantly check the kinds and quantity of the prizes placed on the prize shelves. However, in a game parlor which a number of players enter into and exit from, exchange of the prizes is frequent and a number of kinds of prizes are handed to players according to the players' requests. Inventory of stocks of prizes is not easy. Therefore, such stock control places too high a workload upon clerks.

DISCLOSURE OF THE INVENTION

The present invention was made in view of these problems of the prior art. It is an object of the present invention to provide an article control stand, an article label and an article control apparatus which can improve the services to players on choosing prizes, make prize control correct and achieve a reduction in the workload for clerks.

In order to accomplish the above mentioned object, in an aspect of the present invention there is provided an article control system characterized in that it comprises: an article control stand on which articles are placed; and an article control apparatus for controlling entry and exit of the articles to and from the article control stand; the control apparatus including a planar matrix sensor for detecting the articles; and a signal processing system for driving the matrix sensor and for detecting the articles placed on the matrix sensor; the matrix sensor being disposed on the upper surface of the article control stand.

The article control stand may include an article placing stand on which the articles are placed and an article confirmation stand on which articles which are taken from the article placing stand are temporarily placed for confirmation. The matrix sensors are disposed on the article placing stand and the article confirmation stand, respectively. The matrix sensor comprises a plurality of transmitting lines which are disposed in a parallel relationship, a plurality of receiving lines which are disposed in a parallel relationship and a circuit board for bearing the transmitting and receiving lines thereon, the transmitting and receiving lines are disposed so that they intersect each other.

Each of the transmitting and receiving lines includes parallel sending and returning lines and a bent line which connects the sending and returning lines and detection units are defined by intersecting lines which enclose the units.

The signal processing system is capable of detecting the detection units in which metallic members exist by supplying a signal current to the transmitting lines of the matrix sensor and receiving an output signal from the receiving lines.

In an article control system, an article label bearing codes which can be detected by the matrix sensor is applied to each article which is an object to be detected. The article label includes a metallic coding member representing codes by a metal which can generate an eddy current.

The article control apparatus further includes a computer which compares information on the articles placed on the article placing stand with information on the articles placed on the article confirmation stand for controlling the entry and exit of the articles.

The computer may include storing means which counts signals from the article placing stand for storing the count as the number of received data and replenishing operation means which counts the number of received data stored in the storing means for outputting a replenishing signal when the count number of the received data is equal to or less than a predetermined number. The computer may further include means for storing a change in an article representing signal which is generated by taking out of an article on the article placing stand and means for determining whether or not an article is placed upon the matrix sensor of the article confirmation stand and for outputting a missing article checking signal when the article has not been placed upon the article confirmation stand after the lapse of a predetermined period of time and no signal being output.

An article control system may be installed in a game parlor. The article placing stand and the article control apparatus are provided in a prize exchange area of a game parlor.

The article control apparatus may further include means for detecting the number of game media which a player operating a game machine has gained.

The computer may further include means for detecting information on the article label of the article placed on the article confirmation stand to read the number of game media which are necessary to exchange for the article as a prize and for comparing the read necessary number of game media of the article with the number of the game media detected by the means for detecting the number of the game media which the player has gained to determine whether or not the game media which the player gained can be exchanged for the article on the article placing stand.

When the matrix sensor of the article control stand successively transmits signals having a predetermined frequency to, for example, a plurality of sending and folding transmitting lines from a transmitting circuit for generating a magnetic field, an electromotive force is generated in a receiving line which is electromagnetically coupled with the transmitting line due to mutual induction. When a metallic body such as article label affixed on the article placed on the article platform approaches the matrix sensor at this time, an eddy current is generated on the surface of the metallic body in such a direction that it cancels a magnetic flux generated by the matrix sensor. The magnetic flux is changed by the influence of the eddy current and the amplitude of the electromotive force is correspondingly changed. The position and shape of the metallic body on the article control stand can be determined by detecting the position of the intersection of the transmitting and receiving lines.

The article control apparatus is capable of controlling or monitoring the number of articles on the article control stand by outputting a replenishing signal, for example, when the number of received data from article control stand is equal to or less than a predetermined number.

The article control apparatus determines the kinds and quantity of articles by detecting the articles placed on, for example, the article placing stand by means of the matrix sensor. When the kind and quantity of the articles placed on the article placing stand are changed, the kind and quantity of the article which has effected the change can be determined.

Since an article on the planar matrix sensor can be detected by the matrix sensor along the upper surface of the article control stand, it does not take an extended period of time or much labor to exchange prizes in the prize exchange place of the game parlor so that services to players on selecting of articles are improved and correct prize control is achieved. Since the kinds and quantity of the prizes placed on the article control stand can be checked by means of the article control stand, the workload placed upon the clerks can be reduced.

BEST MODES FOR EMBODYING THE INVENTION

An embodiment of an article control system of the present invention will now be described with reference to drawings.

Figure 1:
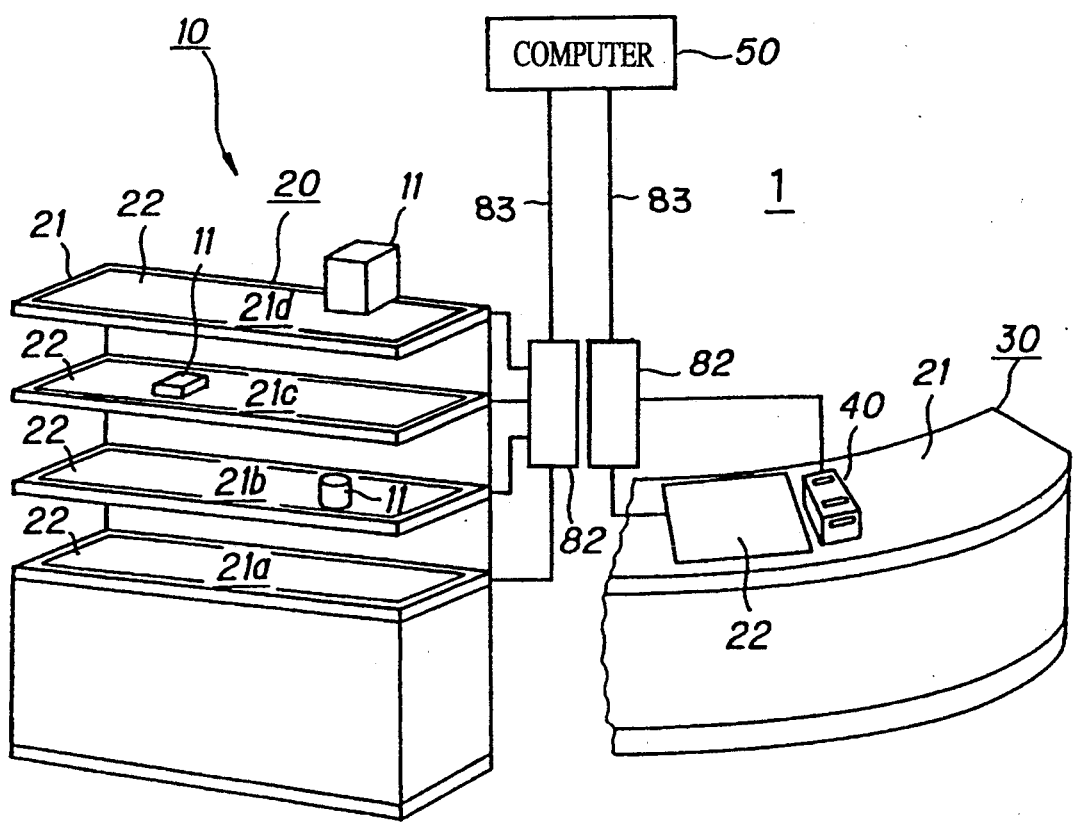
FIG. 1 is a perspective view showing an embodiment of an article control system of the present invention.

As shown in FIG. 1, a system of the present embodiment comprises an article control stand 10 and an article control apparatus 1 for controlling articles such as prizes. The system of the present embodiment is installed on an prize exchange place in a game parlor.

In the system of the present embodiment, the article control stand 10 comprises an article placing stand 20 on which articles are placed and an article confirmation stand 30 for confirming the articles thereon. The article control apparatus 1 comprises matrix sensors 22 which are disposed on the article placing stand 20 and the article confirmation platform 30, a read/write device 40 disposed on the article confirmation stand 30 for reading and writing data from and to recording media, a computer 50 for executing control and repeaters 82 for coupling the matrix sensors 22 and the read/write device 40 with the computer 50. In the present system, article labels which are applied on the articles are used for identification of the articles such as prizes.

The article placing stand 20 and article confirmation stand 30 comprises article platforms 21 and matrix sensors 22. The article platforms 21 comprise a base stand 21a and a plurality of spaced prize shelves 21b, 21c and 21d which are above the base stand 21a. The matrix sensors 22 are placed on the upper surface of the article platforms 21. Various articles 11 are placed on the article platforms 21 as prizes which will be exchanged for game media.

Figure 2:
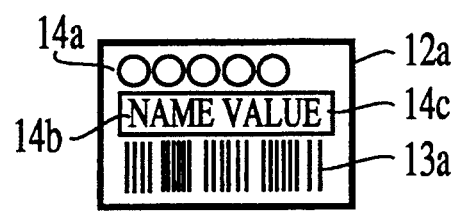
FIG. 2 is a front view of an article label applied upon an article.
Figure 3:
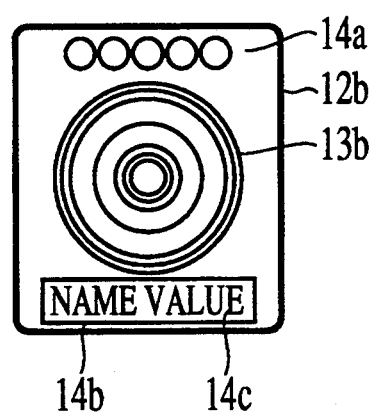
FIG. 3 is a front view of another article label.

An article label 12a shown in FIG. 2 or an article label 12b shown in FIG. 3 is applied on the bottom surface of the articles 11. The article label 12a or 12b includes metallic coding member 13a or 13b, respectively which is detected by 22. The metallic coding member 13a or 13b bears a game parlor identification name 14a, an identification name 14b of the article 11 on which the label is applied, and the number of game media 14c which can be exchanged for the article. The metallic coding member 13a of the article label 12a denotes data on the kind and the quantity of the article by a bar-code like pattern.

The metallic coding member 13a or 13b is made of a material which generates an eddy current by a magnetic flux, such as ink or foil including a metal such as iron, aluminum or copper which may be applied by printing. The read/write device 40 is a recording media reading device for reading data on the number of prizes recorded on a recording medium such as a card and a recording media writing device for newly rewriting data on the kind of prizes recorded on the recording medium.

The computer 50 comprises a central processing unit (CPU), a storage unit for storing the operation programs and data and a display, which are not shown.

Figure 4:
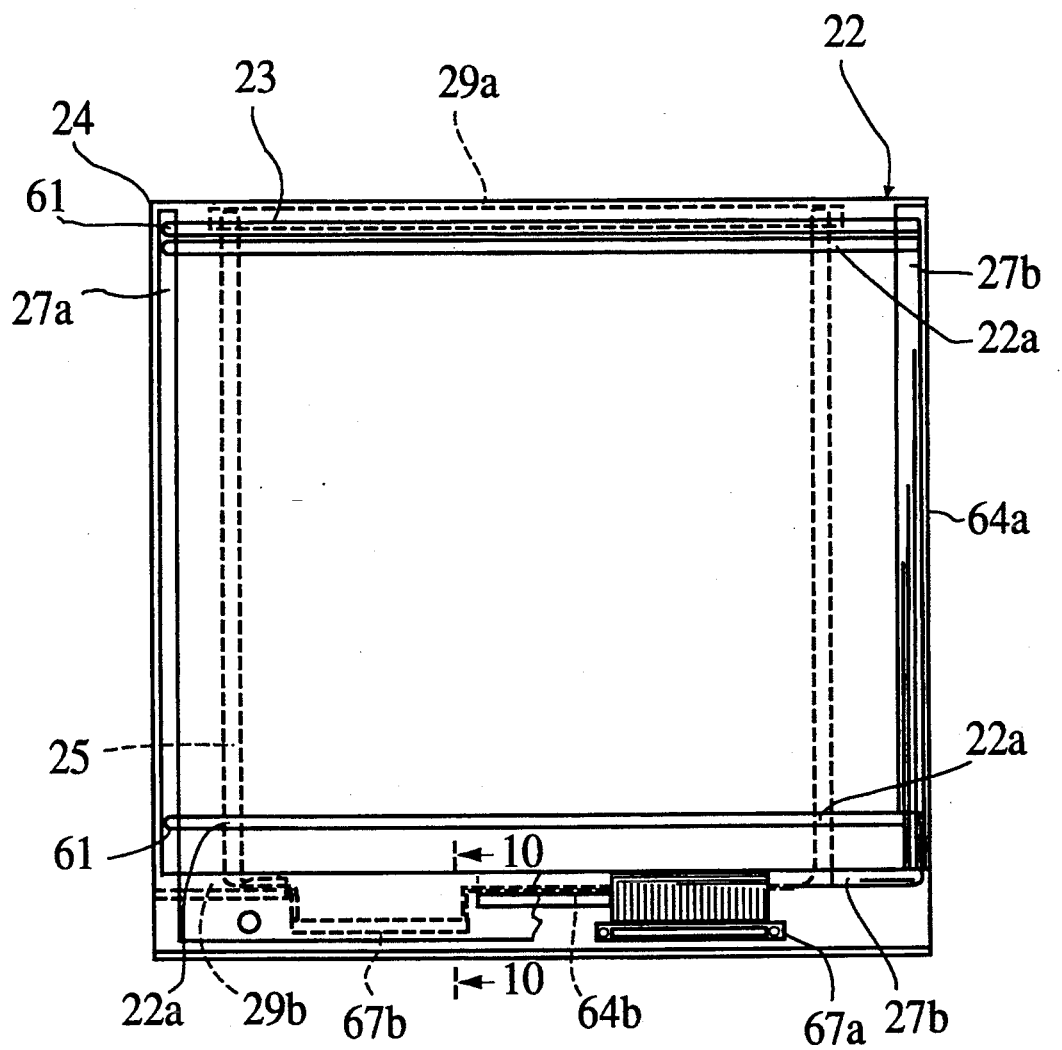
FIG. 4 is a front view of a matrix sensor which is a structural element of a system of the embodiment.

Each of the matrix sensors 22 comprises a board 24, a plurality of transmitting lines 23 and receiving lines 25 which are disposed on the board 24 as shown in FIG. 4. The plurality of transmitting lines 23 and receiving lines 24 form a plurality of detection units for detecting a metal member. These detection units are placed on the board 24 in a matrix and planar manner. The board 24 and various other boards which will be described hereafter are formed of an insulating material such as glass, ceramics or synthetic resin.

Figure 5:
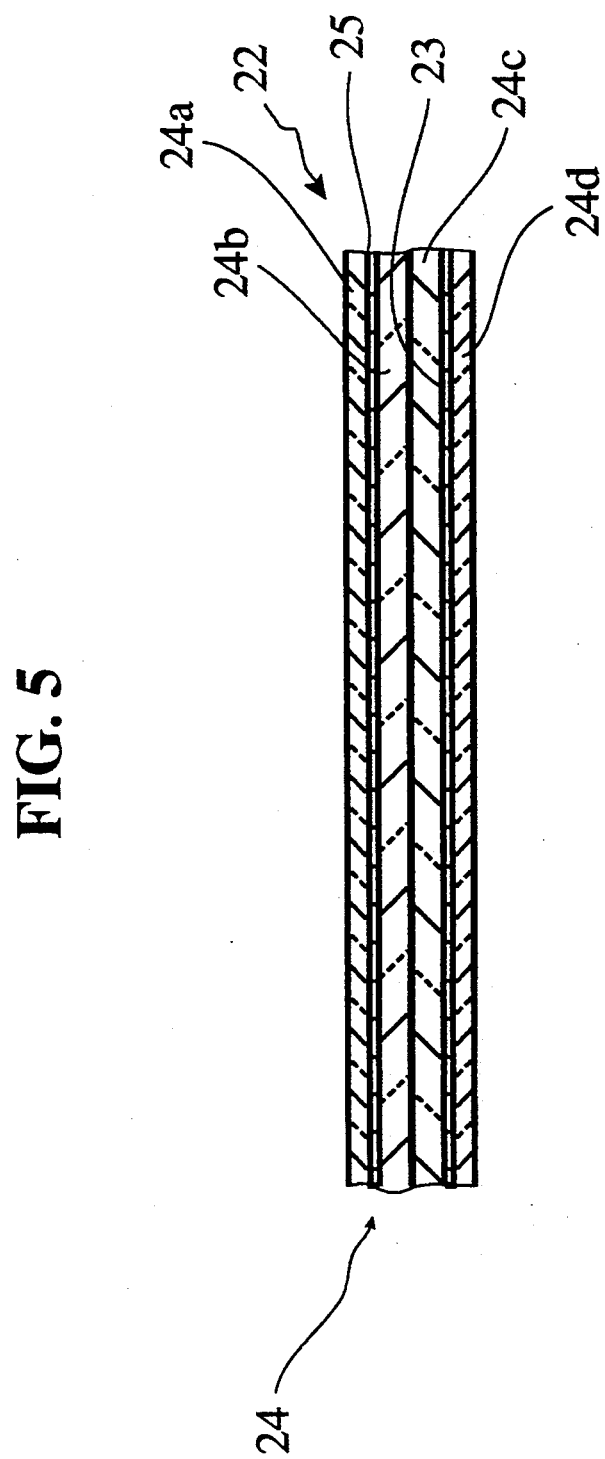
FIG. 5 is a partial longitudinal sectional view of the matrix sensor.

Each of the transmitting lines is arranged in such a manner that it is turned in a U-shape at a bent or folded portion 61. The plurality of transmitting lines 23 are disposed in a parallel relationship with each other on one side of the board 25. Each of the receiving lines 25 is arranged in such a manner that it is turned in a U-shape similarly to the transmitting lines 23. The plurality of transmitting lines 25 are disposed in a parallel relationship with each other on the opposite side of the board 24 and mounted thereon as shown in FIG. 5. The transmitting and receiving terminals 26 and 27 are disposed at one end of the board 24 in a concentrated manner. Illustration of line patterns other than the outermost lines is omitted in FIG. 4. Each receiving line 25 is disposed on a plane which is parallel with a plane on which the transmitting lines 23 are disposed and extends in a direction perpendicular to the transmitting lines 23 so that the receiving line 25 is electromagnetically coupled with respective transmitting lines 23 to change the electromagnetic characteristics of the lines due to the approach of a metallic member such as an article label 12a or 12b applied on the article 11.

Square areas as viewed in a front view of FIG. 4 which are enclosed by the intersecting transmitting lines 23 and the receiving lines 25 constitute detection units 22a for detecting game media by a change in electromagnetic characteristics such as magnetic flux.

Figure 6A:
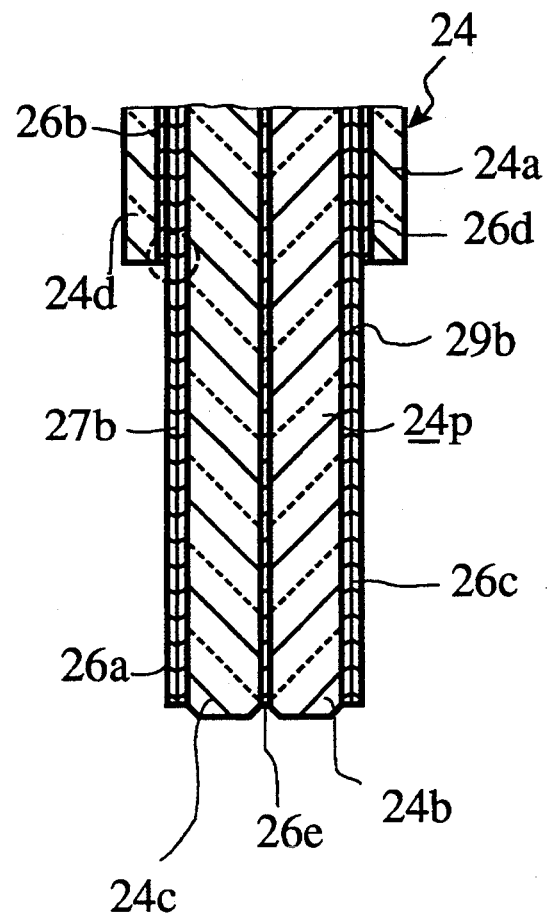
FIG. 6A is an enlarged sectional view of a circuit board having the i matrix sensor.
Figure 6B:
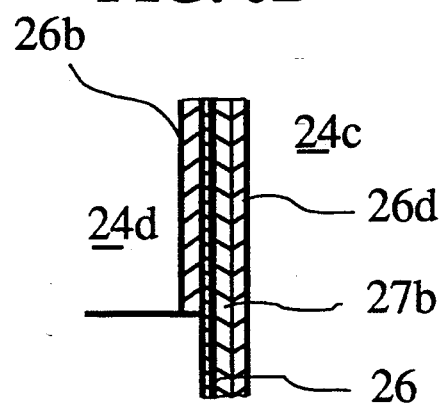
FIG. 6B is an enlarged sectional view of a part represented by a circle in FIG. 6A.

FIGS. 6A and 6B show an enlarged sectional view of the board 24 and an enlarged view of a portion encircled by a dotted line in FIG. 6A, respectively. In FIGS. 6A and 6B, the board 24 is formed into a laminate of four layers comprising a protection plate 24a which is a protection sheet for the receiving lines 25, a receiving line side base board 24b, a transmitting line side board 24c and a protection plate 24d which is a protection sheet for the transmitting lines 23. The board 24 is exposed at one end 24p thereof.

As shown in FIG. 5, the plurality of parallel folding receiving lines 25 are sandwiched between the protection plate 24a and the receiving line side base board 24b and the plurality of parallel folding transmitting lines 23 are sandwiched between the transmitting line side base board 24c and the protection plate 24d. Accordingly, the board 24 is formed as follows: The transmitting lines 23 are adhered to one side of the transmitting line side base board 24c with an adhesive layer 26a. The protection plate 24d is adhered to the transmitting lines 23 with an adhesive layer 26b. The receiving lines 25 are adhered to one side of the receiving line side base board 24b with an adhesive layer 26c and then the protection plate 24a is adhered to the receiving lines 25 with the adhesive layer 26d. The receiving line side base board 24b is adhered to the transmitting line side base structure 24c with an adhesive layer 26e so that the opposite sides of both base boards 24c and 24b are adjacent to each other.

Figure 7:
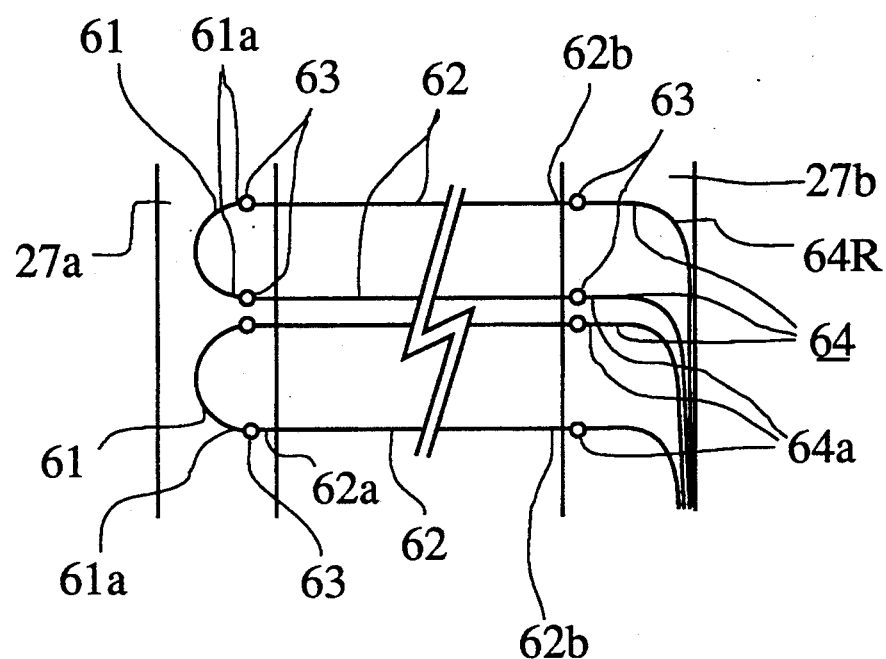
FIG. 7 is a front view showing transmitting lines of the matrix sensor in detail.
Figure 8:
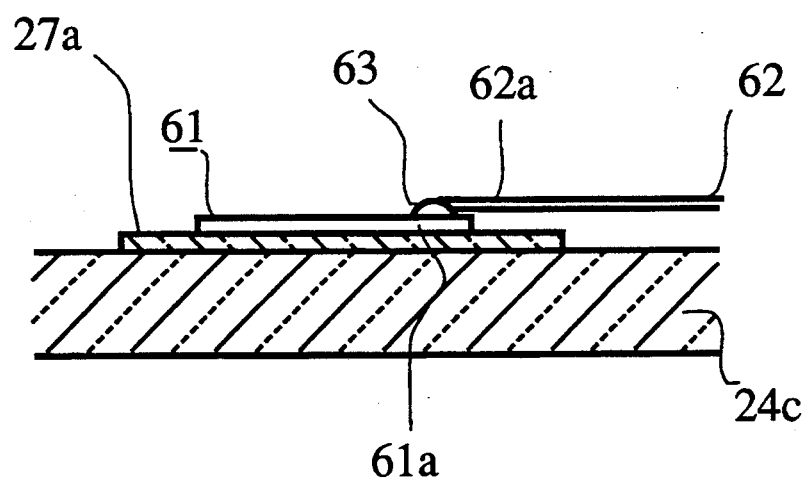
FIG. 8 is an enlarged sectional view showing the connection of wires of the matrix sensor.

As shown in FIG. 4, a transmitting line side line folding board 27a comprises an elongated flexible printed circuit board which is adhered to the rectangular transmitting line side base board 24c, the intermediate portion of which is omitted in FIG. 7 along a longitudinal side thereof. The transmitting line side line returning board 27a forms a wiring portion for returning transmitting lines 23. The transmitting line side folding board 27a is formed with a plurality of, specifically 32, arcuate folded portions 61 which are aligned with each other by a conductor pattern of copper foil. The ends of each line folded portion 61 are bonded to the ends 62a of the wires 62 by means of solder 63. The bonding may be conducted by other means such as welding. The sectional structure of the folding board 27a and the bonded ends 61a and 62a is illustrated in FIG. 8.

Figure 9:
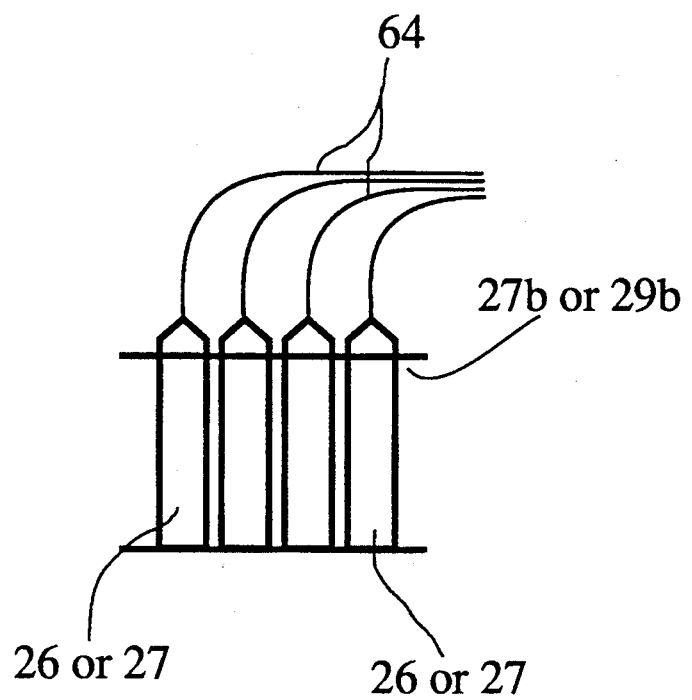
FIG. 9 is an enlarged front view of transmitting terminals of the matrix sensor.

As shown in FIG. 4, a transmitting line side leading board 27b which is substantially L-shaped and is made of a flexible board similarly to the folding board 27a is bonded to the transmitting line side base board 24c along the vertical side thereof opposite to the folding board 27a and a part of the lower side thereof. The transmitting line side leading board 27b includes transmission terminals 26 for external connection and leading line 64 which connect the transmitting lines 23 to the transmitting terminals 26. The transmitting terminals 26 are provided on the transmitting line side leading board 27b at a position corresponding to the lower side of the transmitting line side base board 24. That is, as shown in FIG. 9, a plurality of, specifically 64, transmitting terminals for external connecting which extend in a vertical direction are formed along a part of the side on the lower edge of the transmitting line side leading board 27b by electrically conductive patterns of copper foil. The leading lines 64 to the respective transmitting terminals 26 are formed on the transmitting line side leading board 27b by conductive patterns and extend along the transmitting line side leading board 27b from respective transmitting terminals 26.

The ends 62b of the wires 62 extending from the end 61a of each of the folded lines 61 are connected to the origin points 64a of the corresponding terminal side leading lines 64 by soldering or welding so that the wires 62 are tensioned and in turn connected to the corresponding transmitting terminals 26 via the leading lines 64. Each of the leading lines 64 includes an arcuate line 64R connected between two straight lines for eliminating radio frequency interference.

Similarly, a receiving line side returning board 29a is bonded to the rectangular receiving line side base board 24b along the upper and lateral end side thereof. An elongated receiving line side leading board 29b is bonded to the receiving line side base board 24b along a part of the lateral lower side thereof. The receiving line side returning board 29a is formed similarly to the transmitting line side folding board 27a. As shown in FIG. 9, a plurality of, specifically 64 externally connecting receiving terminals 27 extending in a vertical direction and leading lines 64 extending from the receiving lines to respective receiving terminals 27 are formed by conductive patterns of copper foil on the receiving line side leading board 29b similarly to the transmitting line side leading board 27b.

The transmitting and receiving terminals 26 and 27 are disposed at non opposing positions so that they do not overlap when the receiving line side base board 24b is applied to the transmitting line side base board 24c as shown in FIG. 6A.

In such a manner, the transmitting or receiving lines 23 or 25 comprise folded lines 61 formed on folding board 27a or 29a, the wires 62, the leading lines 64 formed in the leading board 27b or 29b and transmitting or receiving terminals 26 or 27 at which the transmitting or receiving lines 23 or 25 are respectively terminated.

Figure 10:
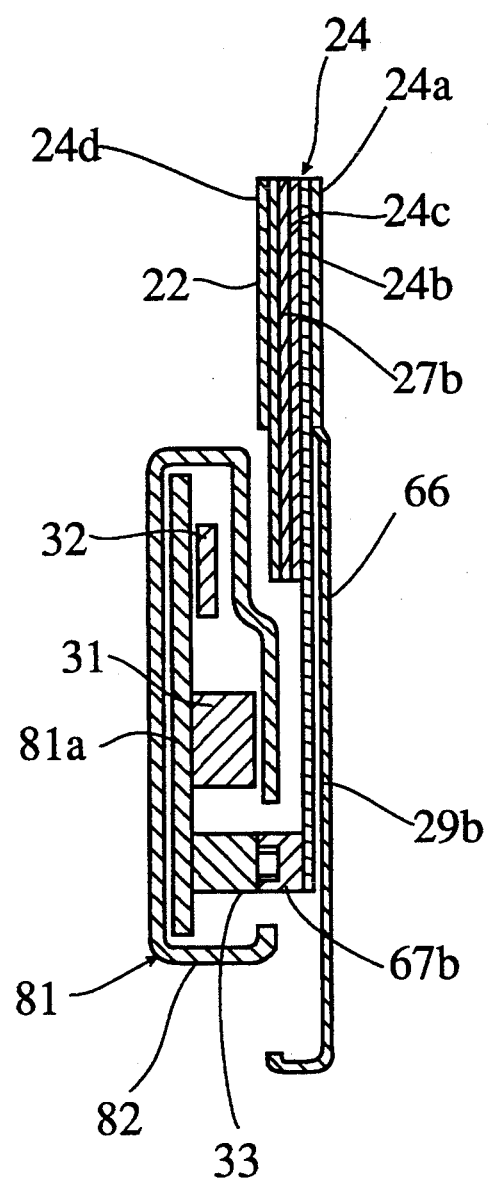
FIG. 10 is a sectional view of the matrix sensor taken along the line 10—10 in FIG. 4.

A shown in FIG. 10, the matrix sensor 22 is provided with a connector mounting plate 66 at the lower end of the receiving and transmitting line side base boards 24b and 24c, respectively.

A transmitting connector 67a and receiving connector 67b are secured to the connector mounting plate 66 at positions corresponding to the transmitting terminals 26 and the receiving terminals 27. The transmitting connector 67a is connected to the transmitting terminals 26 of transmitting lines 23 and the receiving connector 67b is connected to the receiving terminals 27 of the receiving lines 25.

A matrix I/O transmitting/receiving board 81 comprises a mounting board 81a made of a printed circuit board and a matrix I/O casing 82 enclosing the mounting board 81a. A transmitting circuit 31 for transmitting signals to the plurality of transmitting lines 23 of the matrix sensor 22, a receiving circuit 32 for receiving signals from the plurality of receiving lines 25, a coupling connector 33 which is coupled to the transmitting connector 67a (refer to FIG. 4) and the receiving connector 67b are mounted on the mounting board 81a.

Interconnection of the coupling connector 33 with the transmitting and receiving connectors 67a and 67b enables the transmitting receiving terminals 26 and 27 to be connected to the transmitting and receiving circuits 31 and 32, respectively.

A signal processing system which constitutes the article control apparatus for detecting articles 11 is formed as shown in FIGS. 11 through 16.

Figure 11:
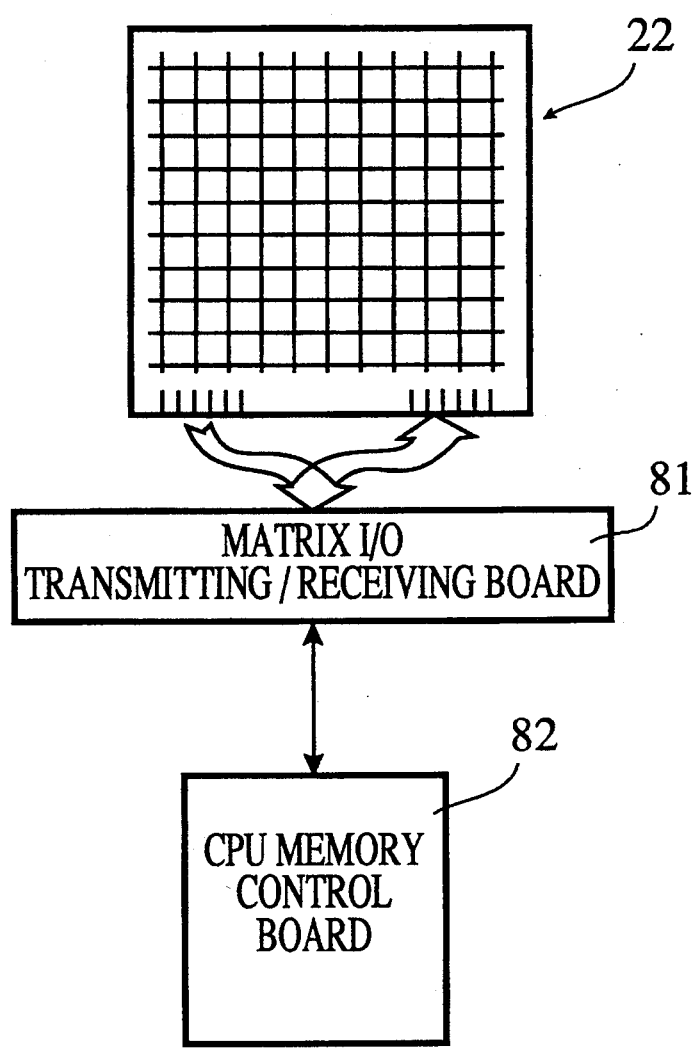
FIG. 11 is a schematic structural view of an article control apparatus which forms the system of the present embodiment.

As shown in FIG. 11, the matrix sensor 22 is under control of a CPU memory control board 82 via the matrix I/O transmitting/receiving board 81. The CPU memory control board 82 constitutes a repeater and is capable of communicating with the computer via a communication line 83 as shown in FIG. 1.

The matrix I/O transmitting/receiving board 81 has a transmitting circuit board (not shown) which is provided with the transmitting circuit 31 and a receiving circuit board (not shown) which is provided with the receiving circuit 32. The transmitting circuit 31 consecutively transmits signals having a predetermined frequency to respective transmitting lines 23 and the receiving circuit 32 consecutively receives signals from the receiving lines in synchronization with the transmitting circuit 31.

Figure 12:
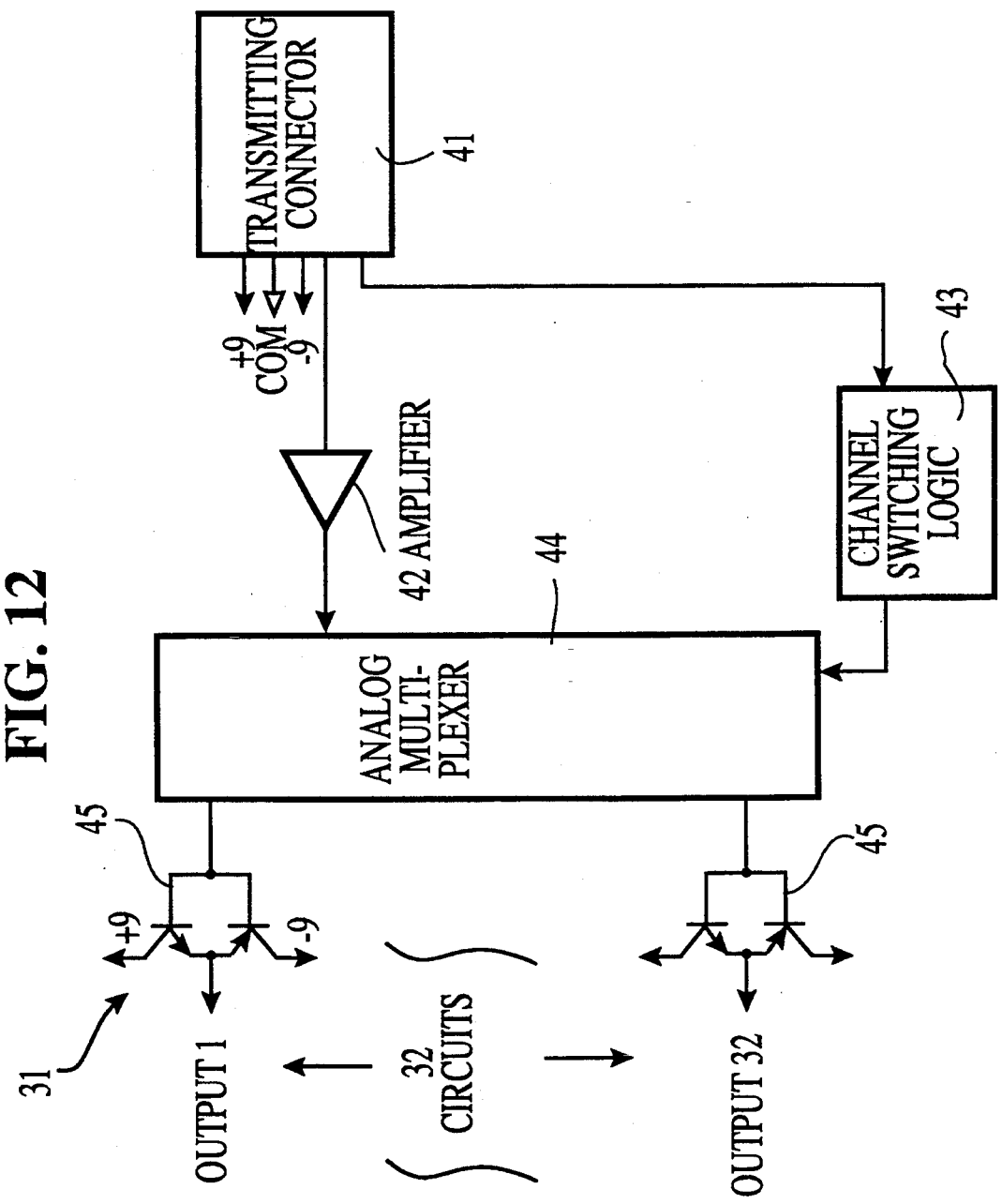
FIG. 12 is a block diagram of a transmitting circuit on a matrix I/O transmitting and receiving board of the article control apparatus.

As shown in FIG. 12, the transmitting circuit 31 comprises an amplifier 42 and a channel switching logic 43 which are connected to the transmitting connector 41, an analog multiplexer 44 which is connected to the amplifier 42 and the channel switching logic 43, and totem pole type drivers 45 each comprising a pair of PNP and NPN transistors which are connected to the transmitting lines 23 of a plurality of, specifically 32, circuits via the transmitting connector 67a (refer to FIG. 4).

Figure 13:
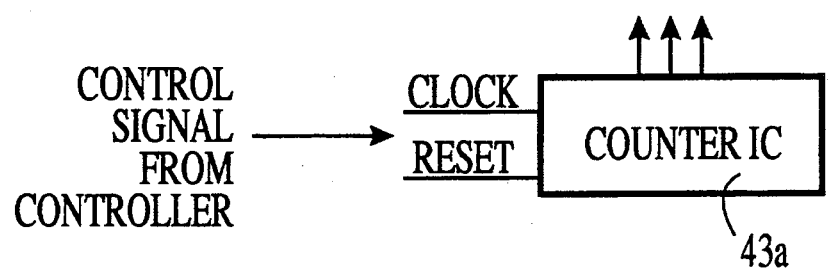
FIG. 13 is a block diagram showing a main part of a channel switching logic.
Figure 14:
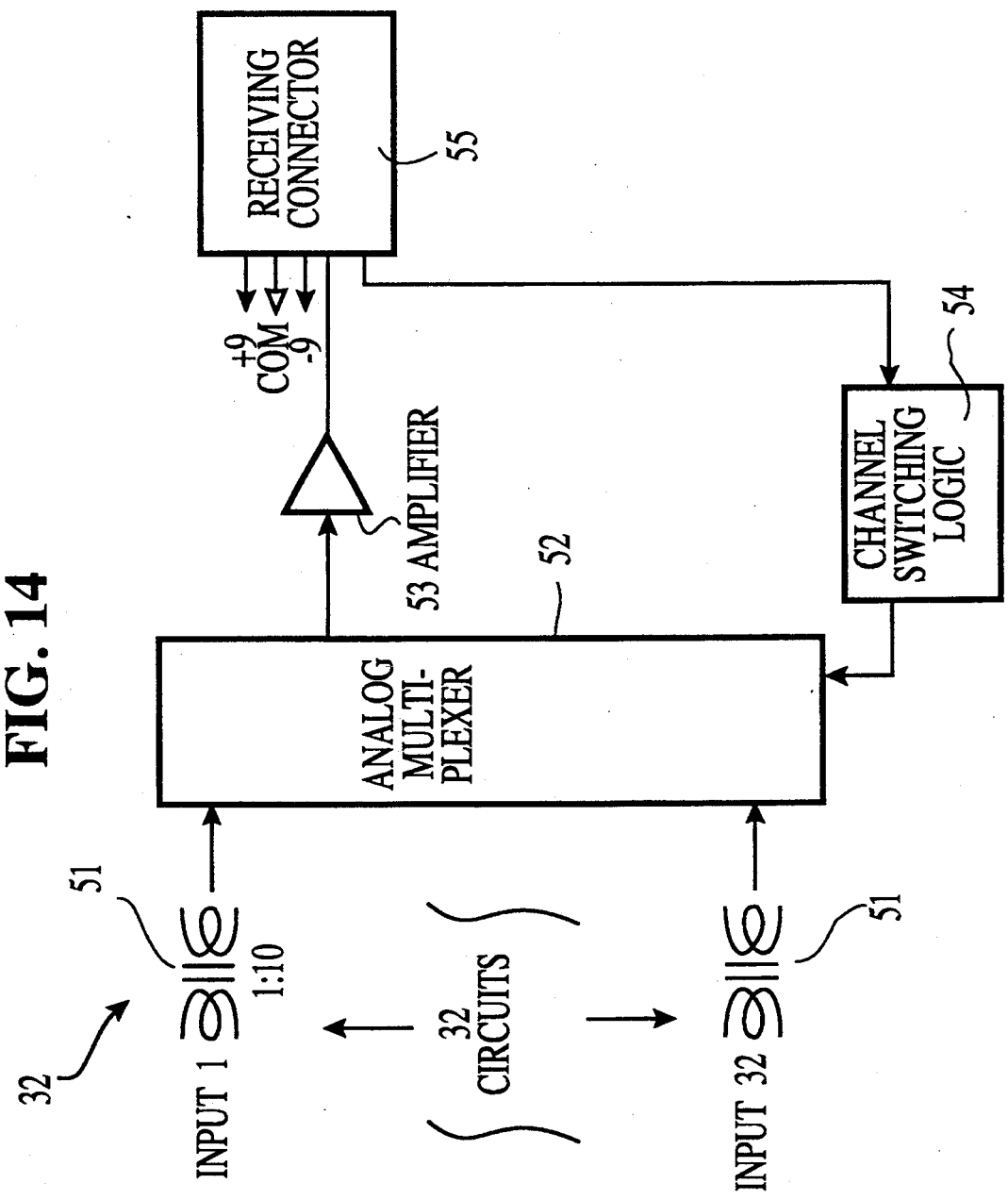
FIG. 14 is a block diagram of a receiving circuit of the matrix I/O transmitting and receiving board.

The channel switching logic 43 is operated by effectively using a counter IC 43a which is controlled by two clock and reset control lines shown in FIG. 13.

The receiving circuit 32 comprises 32 CT sensors (rectifiers) 51 which are connected to the receiving lines of a plurality of, specifically 32, circuits via the receiving connectors 67b (refer to FIG. 4), an analog multiplexer 52 which is connected to the CT sensors 51, an amplifier 53 and a channel switching logic 54 which are connected to the analog multiplexer 52 and a receiving connector 55 which is connected to the amplifier 53 and the channel switching logic 54. Accordingly, the receiving circuit 32 receives signals from the receiving lines 25 via CT sensors 51.

The CT sensors 51 isolate the analog multiplexer 52 from the receiving lines 25 and amplify signals from the receiving lines 25. The analog multiplexer 52 consecutively receives signals from each of the CT sensors 51. The amplifier 53 amplifies signals from the analog multiplexer 52. The channel switching logic 54 is a logical circuit having the same configuration as the channel switching logic 43 of the transmitting circuit 31.

Figure 15:
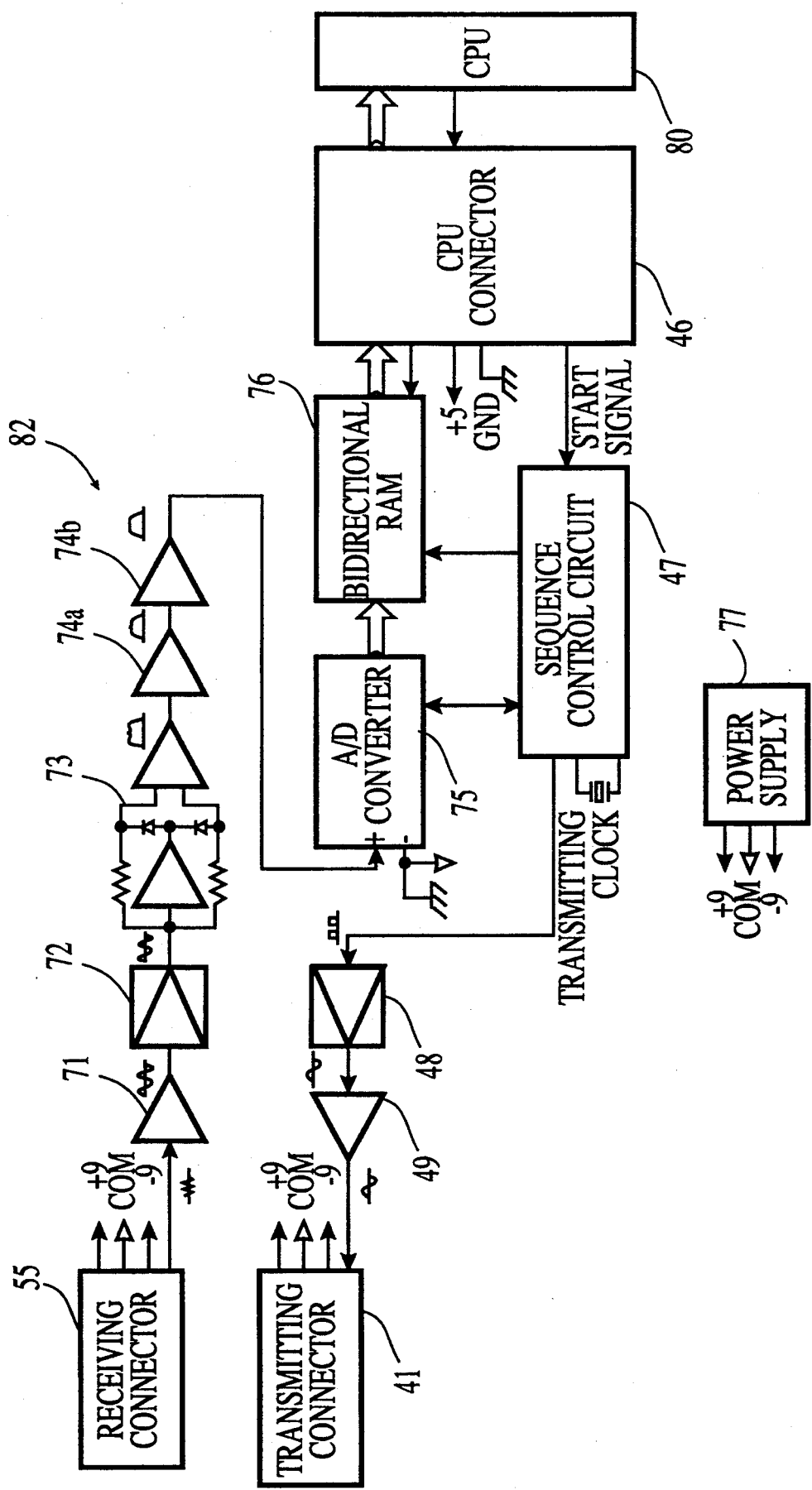
FIG. 15 is a block diagram of transmitting and receiving circuits of a CPU memory control board.

As show in FIG. 15, the CPU memory control board 82 includes in the transmitting unit side a CPU connector 46 which is connected to a CPU (central processing unit) 80, a sequence control circuit 47 for sending a transmitting clock in response to a start signal from the CPU 80 via the CPU connector 46, a band pass filter 48 which receives the transmitting clock to send a transmitting signal, and an amplifier 49 for amplifying the transmitting signal to send it to the transmitting connector 41.

The CPU memory control board 82 includes in the receiving unit side an amplifier 71 for amplifying a received signal from the receiving connector 55, a band pass filter 72 for receiving the amplified signal, a full wave rectifier and amplifier 73 for receiving the received signal output from the band pass filter 72, two stages of low pass filters 74a and 74b for receiving the received signal output from the full wave rectifier and amplifier 73, an A/D converter 75 for receiving the received signal output from the low pass filter 74b to send digital data to a bidirectional RAM 76 under control of the sequence control circuit 47 and the bi-directional RAM 76 to which received data is written under control of the sequence control circuit 47 and from which the received data is sent to the CPU 80 via the CPU connector 46 in response to a read-out signal from the CPU connector 46.

The bidirectional RAM 76 is a memory for storing the positions of article labels 12a (or 12b) as detection data of detection units 22a defined by the transmitting and receiving lines 23 and 25 based upon the signals from the receiving circuits 32 and has a counter therein.

Processing of all the matrix data of the article labels 12a (or 12b) is conducted by the counter. The CPU memory control board 82 further includes a power supply unit 77.

Figure 16A:
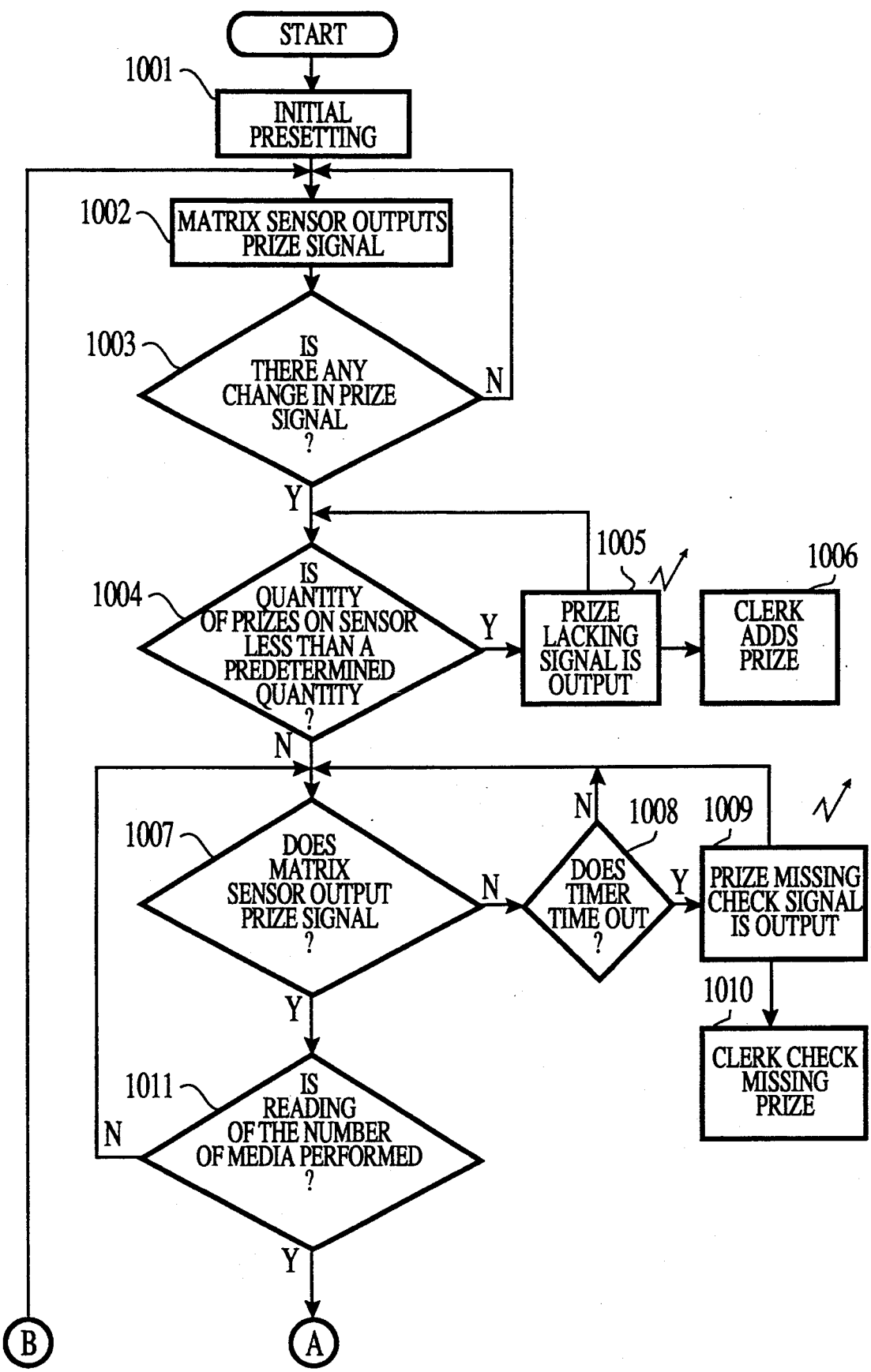
FIG. 16 is a flow chart showing a processing in the article control apparatus.
Figure 16B:
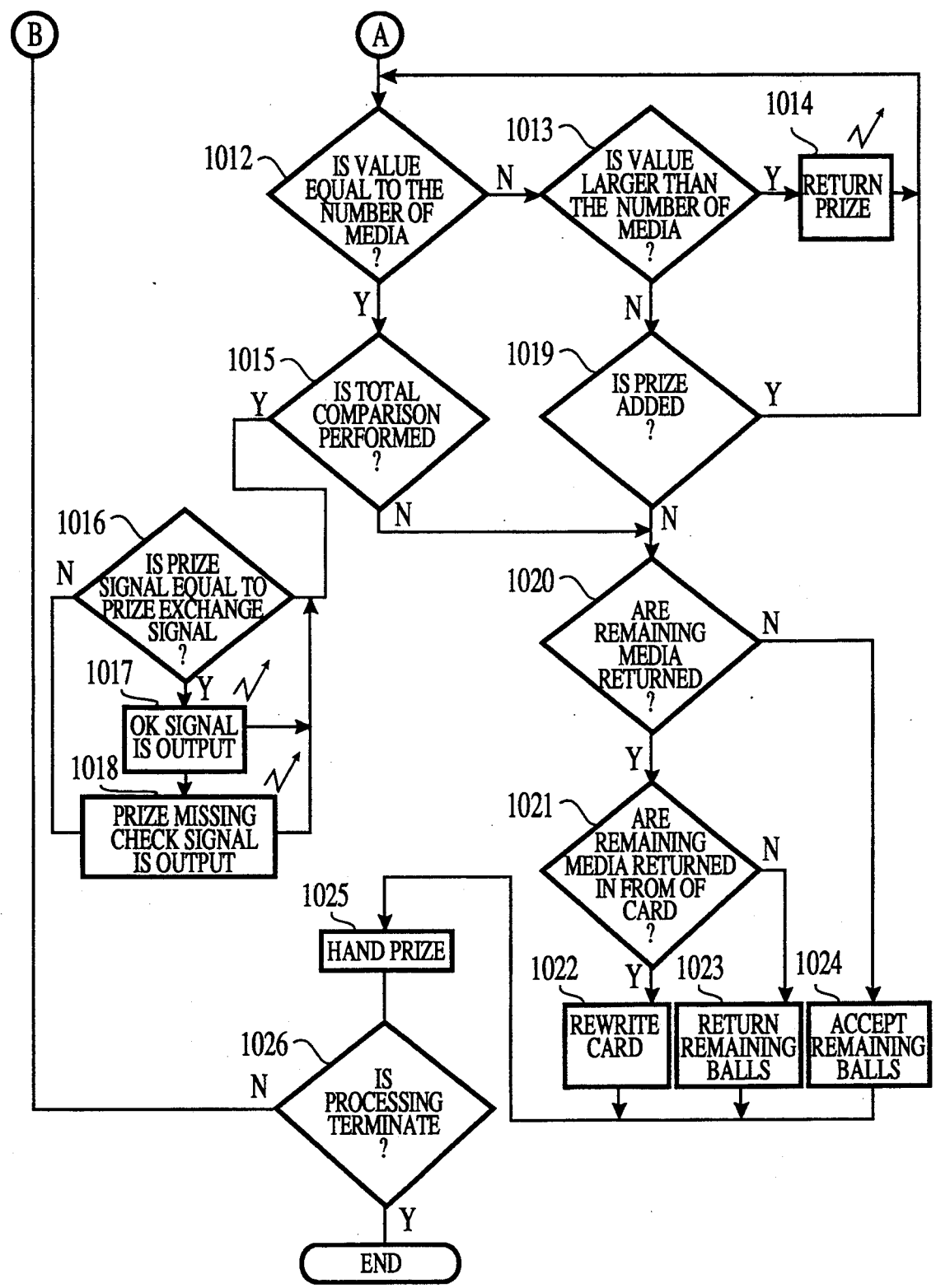

Now, operation of the present embodiment will be described with reference to FIG. 16.

In a prize exchange place, necessary prizes 11 are replenished and placed on the article placing stand 20. The article labels 12a or 12b which are shown in FIGS. 2 and 3, respectively are preliminarily affixed to the prizes. The prizes are placed upon the article placing stand 20 in such a manner that the article labels 20 are in contact with the matrix sensor on the article placing stand 20.

The computer 50 performs initial presetting under this condition (step 1001). The initial presetting gives an instruction to the CPU memory control board 82 to firstly drive the matrix sensor 22. The matrix sensor 22 may be continuously driven. Such continuous driving makes it possible to monitor whether or not articles have been removed away from the stand by an authorized person. On starting of the operation, the computer 50 accepts prize signals from the matrix sensor 22 of the article placing stand 20 via the CPU memory control board 82 for storing the positions, identifications and the number of the prizes. The matrix sensor 22 is capable of detecting a metal, which is the metal coding member 13a or 13b of the article label 12a in this embodiment existing on the detection units 22a to determine the positions thereof.

Principle of operation of the matrix sensor will be briefly described.

When a signal current flows through the transmitting lines 23 of the matrix sensor 22, an alternate magnetic flux is correspondingly generated. The magnetic flux induces an induction current through the receiving lines. If a metallic member approaches any one of the detection units 22a at this time, an eddy current is generated in the metallic member, causing the magnetic flux around the metallic member to be changed. As a result, the induction current through the receiving lines 25 is changed. The detection unit 22a on which the metallic member exist can be determined to locate the position of the metallic member by detecting the change in the induction current to determine the transmitting lines 23 and the receiving lines 25, the induction current through which has been changed.

Information from the matrix sensor 22 is constantly monitored to ascertain whether or not there is a change in the condition (steps 1002 and 1003).

If there is a change in the prize signal, determination as to whether or not the quantity of the prizes on the article placing stand 20 is equal to or less than a predetermined value is made. If it is less than the predetermined value, a prize lacking signal is generated to notify a clerk of the lack of prizes (steps 1004, 1005 and 1006). The method of notifying the clerk includes a method of notifying through sounds or lights, and a method of displaying the names and quantity of lacking articles on a screen or with a printer. A message and the like may be announced to the clerk that prizes are to be replenished. If the clerk confirms the data and replenishes the lacking prizes, lack of prizes is no longer the situation and the program will proceed to the next step.

When a player tells the clerk which of the prizes are desired to be exchanged for the required game media, the clerk will take the prize from the article placing stand 20 and place it or them on the article confirmation stand 30. Accordingly, it is monitored whether or not the prize is placed on the matrix sensor 22 on the article confirmation stand 30 (step 1007). When the computer 50 detects that the prize has been removed from the article placing stand 20, it activates a timer for each prize. When the computer 50 detects that the prize is placed upon the matrix sensor 22 in the side of the article confirmation stand 30, it monitors whether or not a predetermined period of time has lapsed since the prize has been removed from the article placing stand 20 (step 1008). When the predetermined period of time or more has lapsed, a prize missing check signal is generated (step 1009).

This is indicated by sounds and/or lights. The missing prize is displayed on a screen or printed by a printer. The clerk then goes to the article placing stand 20 for confirmation and determines whether the prize is in fact missing, or is held by the player or is placed at in incorrect position(step 1010). In the last case, the prize is returned to the proper position.

Then, reading operation of the read/write device 40 is monitored (step 1011). The player puts the acquired game media into a game media counter (not shown) installed in the game parlor for counting the number of game media. The count is written in a recording medium such as a magnetic card which is then returned to the player.

When the card is inserted into the read/write device 40, the number of the game media is read. After reading, a value of a prize on the article confirmation stand 30 (the number of the game media which need to be exchanged for the prize on the article confirmation stand) is compared with the number of the game media which has been read from the card inserted into the read/write device 40. If the value is equal to the number of game media, determination as to whether or not to carry out an operation for comparing the total payout of the article placing stand 20 with the total payout of the article confirmation stand 30 is made (step 1015). This determination is made by a manual operation of a clerk or the timer setting after closing the parlor. If it is preset that total comparison is made, a prize signal from the article placing stand 20 is compared with a prize exchange signal from the article confirmation stand 30. If they coincide, an OK signal is output. If they do not coincide, a missing prize check signal is output to urge the clerk to investigate the missing prize. When the trouble is traced and proper signal processing can be made possible, the OK signal is issued instead of the check signal.

If no total comparison is made, determination as to whether or not the residual game media are returned is made (step 1020). If the game media are not returned, the remaining game media are accepted (step 1024) and the prize is handed to the player (step 1025). If there are no remaining game media, the prize is handed to the player without any procedure (step 1025).

If remaining game media are returned to the player, the determination as to whether or not to return the card in which the acquired value is added is made (step 1021). If the card is returned, the content of the card is rewritten so that the attained value is added to an original value and the card and the prize are handed to the player (steps 1022 and 1025). The rewritten card can be used again.

If it is not possible to return the remaining game media in the form of a card, an equivalent number of game media are returned and the prize is handed over (steps 1023 and 1025).

If the score of the prize is not equal to the number of game media at step 1012, determination as to whether or not the value of the prize is larger than the number of game media is made. If the value of the prize is larger than the number of game media, the prize is returned to the article placing stand 20 so that the value of the prize is not larger than the number of the game media (steps 1013, 1014).

If it is determined that the value of the prize is smaller than the number of acquired game media, the clerk asks the player whether or not another prize is added. If another prize is added, the clerk takes a prize from the article placing stand 20 and reads the prize on the matrix sensor 22 of the article confirmation stand 30 to determine whether or not the combined value of the prizes is equal to the number of game media again.

If another prize is not chosen, the clerk confirms whether or not remaining game media are to be returned (step 1020). If the remaining game media are not returned, the game media are accepted and the prize is handed over (steps 1024, 1025).

If the remaining game media are returned, the clerk asks whether or not return of the game media is to be made in the form of a card. If the returning is made in the form of a card, the card with rewritten contents and the prize are handed (steps 1021, 1022 and 1025). If returning is not to be made in the form of the card, the remaining game media are returned and the prize is handed Over (steps 1023 and 1025).

All the shelves of the article placing stand 20 in the prize exchanging counter, on which articles are placed have the matrix sensors 22 on the upper surface thereof. Articles are arranged in a row on the matrix sensor 22. A label 12a or 12b is affixed to the bottom surface of each article 11. The kind and the score of the article which may be exchanged for a predetermined number of media are identified by the metallic code 13a or 13b having a specific pattern. Application of the labels upon articles may be carried out by the parlor's clerks or the retailer of the articles. The metallic code 13a or 13b can be detected by the matrix sensor 22.

When the articles 11 to which the article labels 12a or 12b are affixed are placed upon the matrix sensor 22 on the upper surface of the article platform 21, the matrix sensor 22 reads the metallic code 13a, 13b. The results of the reading are fed to the computer 50 as mentioned above and are identified so that data on the kind, the number and the place of the articles are collected. Even if the articles 11 are collectively arranged in one place or separately arranged, data on each article 11 can be collected independently of the arrangement of the articles 11.

When the data received from the article placing stand 20 show that the number of articles is equal to or less than a predetermined number of articles which is preset as the minimum number of articles 11 to be placed on the article platform 21, a replenishing signal is output in response to the prize lacking signal so that the clerk can immediately replenish the lacking articles in accordance with the replenishing signal. Accordingly, the articles 11 on the article placing stand 20 can be controlled in such a manner that the number of articles 11 will not become insufficient.

In other words, the present article control system is programmed in such a manner that a message will be announced when the number of articles 11 on the article placing stand 20 becomes equal to or less than a predetermined number. Control of prizes can be achieved by a clerk replenishing the lacking articles 11 on the article placing stand 20 when the message is issued. Although the clerk has heretofore counted the number of prizes remaining on the prize shelves and has calculated the total payout for inventory of stock and replenished lacking articles to the prize shelves and then opened the game parlor after inputting the names and the quantity of replenished prizes to a computer, it is not necessary to confirm the quantity of articles prior to closing of the parlor since the names and quantity of the articles are always known in accordance with the present system. The clerk or clerks can close the game parlor without any confirmation work.

Entry of data on purchased articles 11 through a numerical key pad enables the computer 50 to perform automatic control of the articles 11. The names and the quantity of the articles 11 are automatically input to the computer 50 at the time when the articles 11 are arranged on the article placing stand 20. Data on stocks in a warehouse and stocks on the article placing stand 20 are separately stored and they can be displayed and printed.

The articles 11 placed on the article placing stand 20 are detected by the matrix sensor 22 to determine the kind and quantity of the articles 11 from the first received signal. That is, if a player takes an article 11 (for example, 11a) from the article platform 21 in order to make a decision to choose the article, it is detected that one article 11(a) is missed. If another player takes another other article 11 (for example 11(b)), it is detected that the other article 11(b) is missing. If the player returns the article 11(a) to the article platform 21 and takes one more article 11(c), the existence of the former article 11(a) and the fact that the other two articles 11(b) and 11(c) are missing is detected.

Since data on the article 11 temporarily disappears since a player takes the article 11 until he or she places the article 11 on the article confirmation stand 30 in the prize exchange place, the article 11 can be monitored on a priority basis.

The articles on the article confirmation stand 30 can be detected by the matrix sensor 22 to determine the kind and quantity of the articles 11 from the received signal from the sensor. When the determined kind and quantity of the articles 11 is equal to or less than kind and quantity of the articles 11 which has effected a change on the article placing stand 20, it can be determined that the article control is operating normally for the parlor.

That is, when a player places the articles 11 taken from the article platform 21 on the matrix sensor 22 of the article confirmation stand 30 in the prize exchange place, the matrix sensor 22 detects the article labels 12a or 12b affixed to the bottom of the articles 11 to determine the kind and quantity of the articles 11 and the necessary number of game media and to collect data on them. When a clerk depresses a confirmation switch, an exact calculation is conducted for the adjustment between the articles 11 and the game media which the player has won.

Several articles 11 may be simultaneously placed upon the article confirmation stand or alternatively they may be placed one by one.

At the time when the articles 11 have been placed on the article confirmation stand 30, the articles 11 on the stand 30 are compared with the articles that have disappeared from the article placing stand 20. If the articles 11 on the article confirmation stand 30 agree with the articles 11 that have disappeared from the article placing stand 20, it will be determined that the articles 11 have been paid out to the player as prizes.

The names and quantity of the articles 11 from the article placing stand 20 and those from the article confirmation stand 30 are recorded in the computer 50 and the number of the game media which the read/write device 40 read from the card are input thereto.

If the computer 50 does not accept a signal within a predetermined period of time from when it notices the change in articles 11 on the article placing stand 20 from a difference data signal, it will output a missing signal in response to the prize missing check signal to notify the clerk that the articles have been moved to the article confirmation stand 30 from the article placing stand 20. If the article 11 which has disappeared from the article placing stand 20 is not confirmed on the article confirmation stand 30 even when a predetermined or greater period of time has lapsed, an alarm is given in response to the missing signal to notify the clerk. Also if an article 11 is detected on the article confirmation stand 30 or more articles 11 are detected although there is no information representing that articles 11 have disappeared from the article placing stand 20, an alarm is given to notify the clerk.

If the article 11 which was taken by the player is returned to the article placing stand 20 in such a manner that the label 12a or 12b does not correctly rest on the matrix sensor 22, or the article 11 is placed in an inverted or irregular position, the article 11 cannot be detected. Therefore, since the article 11 on the article confirmation stand 20 is not confirmed, it will be immediately checked and corrected in response to an alarm from the computer.

If the calculation of the articles 11 on the article placing stand 30 shows that the total number of the game media which is equivalent to the articles is larger than the number of game media which the player has won, it suffices to return the excess articles 11 from the article confirmation stand 30 to the article placing stand 20 and no other processing is needed.

If the total comparison is finally made, the system is brought into a comparison mode by a manual switch or a timer. If the kind and quantity of the articles 11 placed on the article confirmation stand 30 are such that the kind and the quantity of the articles 11 which have disappeared from the stand 20 agree with those of the articles 11 which have effected a change on the stand 20, an OK signal is outputted. If they disagree, a prize lacking check signal is output and the clerk investigates it. If the correction operation is completed, an OK signal is issued.

The record/write device 40 is arranged so that cards can be inserted thereto from both sides of the clerk and player and the number of the game media which will be recorded on the card is displayed on the record/write device 40.

If the value which is calculated from the kind and quantity of the agreed articles 11 is larger than the number of the game media recorded on the card, a prize returning signal is output for processing.

The matrix sensor 22 detects the receiving line 25, which changed a signal and the transmitting line 25 which transmits a signal at this time on a scanning basis.

The detected information is fed to the CPU 80 by which the position and shape of the metallic coding member 13a or 13b on the detection unit of the matrix sensor are identified.

The bidirectional RAM 76 stores the position of the article 11 on the matrix sensor 22 at an intersecting position of the receiving line 25 which changes the received signal and the transmitting line 23 which transmits a signal at this time in accordance with a signal from the receiving circuit 32 as detection data of the detection unit 22a defined by the transmitting and receiving lines 23 and 25.

The CPU 80 reads the detection data on the position of the article which was recorded in the bilateral RAM 76 in response to a read start signal for operation processing according to needs. The CPU 80 repeats this processing.

Since the transmitting connector 67a and the receiving connector 67b are detachably mounted on the coupling connector 33, the matrix sensor 22 can be easily exchanged or mounted by removing the glass circuit board 81a from the matrix I/O transmitting/receiving board 81 if the sensor 22 is faulty.

The article control stand and the article control apparatus may be also used for article control in retail shops. In this case, they may be configured so that a total charge is displayed on a register and the clerk receives the charge and inputs the received amount through a numerical key pad, then a receipt and the amount of change are output. Article identification, quantity and the amount of payment, etc. may be printed on the receipt.

The recording medium may be a receipt as well as a card. The amount of money recorded on the card or receipt may be recorded in the form of the number of the game media which the player has won.

In lieu of the record/write device 40, a game media counter or a coin counter may be connected.

The above mentioned embodiment is only an example for illustration. The present invention is not limited to only this embodiment.

What is claimed is:

1. An article control system characterized in that is comprises:
   an article stand on which articles are placed; and
   an article monitor apparatus for monitoring entry and exit of the articles to and from the article stand;
   said monitor apparatus includes a planar matrix sensor for detecting the articles; and a signal processing system for driving the matrix sensor and for detecting the articles placed on the matrix sensor;
   the matrix sensor being disposed on the upper surface of said article stand.

2. An article control system as defined in claim 1 in which the article stand includes an article placing stand on which the articles are placed and an article confirmation stand on which articles which are taken from the article placing stand are temporarily placed for confirmation.

3. An article control system as defined in claim 2 in which the matrix sensor is disposed on the article placing stand and the article confirmation stand.

4. An article control system as defined in claim 3 in which the matrix sensor comprises a plurality of transmitting lines which are disposed in a parallel relationship, a plurality of receiving lines which are disposed in a parallel relationship and a circuit board for bearing the transmitting and receiving lines thereon,
   said transmitting and receiving lines being disposed so that they intersect each other;

each of said transmitting and receiving lines including parallel sending and returning lines and a bent line which connects the sending and returning lines and detection units being defined by the intersecting transmitting and receiving lines of the matrix sensor.

5. An article control system as defined in claim 4 in which the signal processing system is capable of detecting the detection units in which metallic members exist by supplying a signal current to the transmitting lines of the matrix sensor and receiving an output signal from the receiving lines.

6. An article control system as defined in claim 5 in which an article label bearing codes which can be detected by the matrix sensor is applied to each article which is an object to be detected.

7. An article control system as defined in claim 6 in which the article label includes a metallic coding member representing codes by a metal which can generate an eddy current.

8. An article control system as defined in claim 3 in which said article monitor apparatus further includes a computer which compares information on the articles placed on the article confirmation stand for controlling the entry and exit of the articles.

9. An article control system as defined in claim 8 in which the computer includes storing means which counts signals from said article placing stand for storing the count which is the number of received data and replenishing operation means which counts the number of received data stored in said storing means for outputting a replenishing signal when the count number of the received data is equal to or less than a predetermined number.

10. An article control system as defined in claim 8 in which the computer further includes means for storing a change in an article representing signal which is generated by the taking out of an article from the article placing stand and means for determining whether or not an article is placed upon the matrix sensor of the article confirmation stand and for outputting a missing article checking signal when the article has not been placed upon the article confirmation stand after the lapse of a predetermined period of time and no confirmation signal is output from the matrix sensor of the article confirmation stand.

11. An article control system as defined in claim 8 in which the article placing stand and the article monitor apparatus are provided in a prize exchange place of a game parlor.

12. An article control system as defined in claim 11 in which the article monitor apparatus further includes means for detecting the number of game media which a player performing a game machine gained.

13. An article control system as defined in claim 12 in which the computer further includes means for detecting information on the article label of the article placed on the article confirmation stand to read the number of game media which need to be exchanged for the article as a prize and for comparing the read necessary number of game media of the article with the number of game media detected by the means for detecting the number of game media which the player gained to determine whether or not the game media which the player gained can be exchanged for the article on the article confirmation stand.

* * * * *